(No Model.)
R. H. ADAIR.
PLOW.
No. 320,611. Patented June 23, 1885.
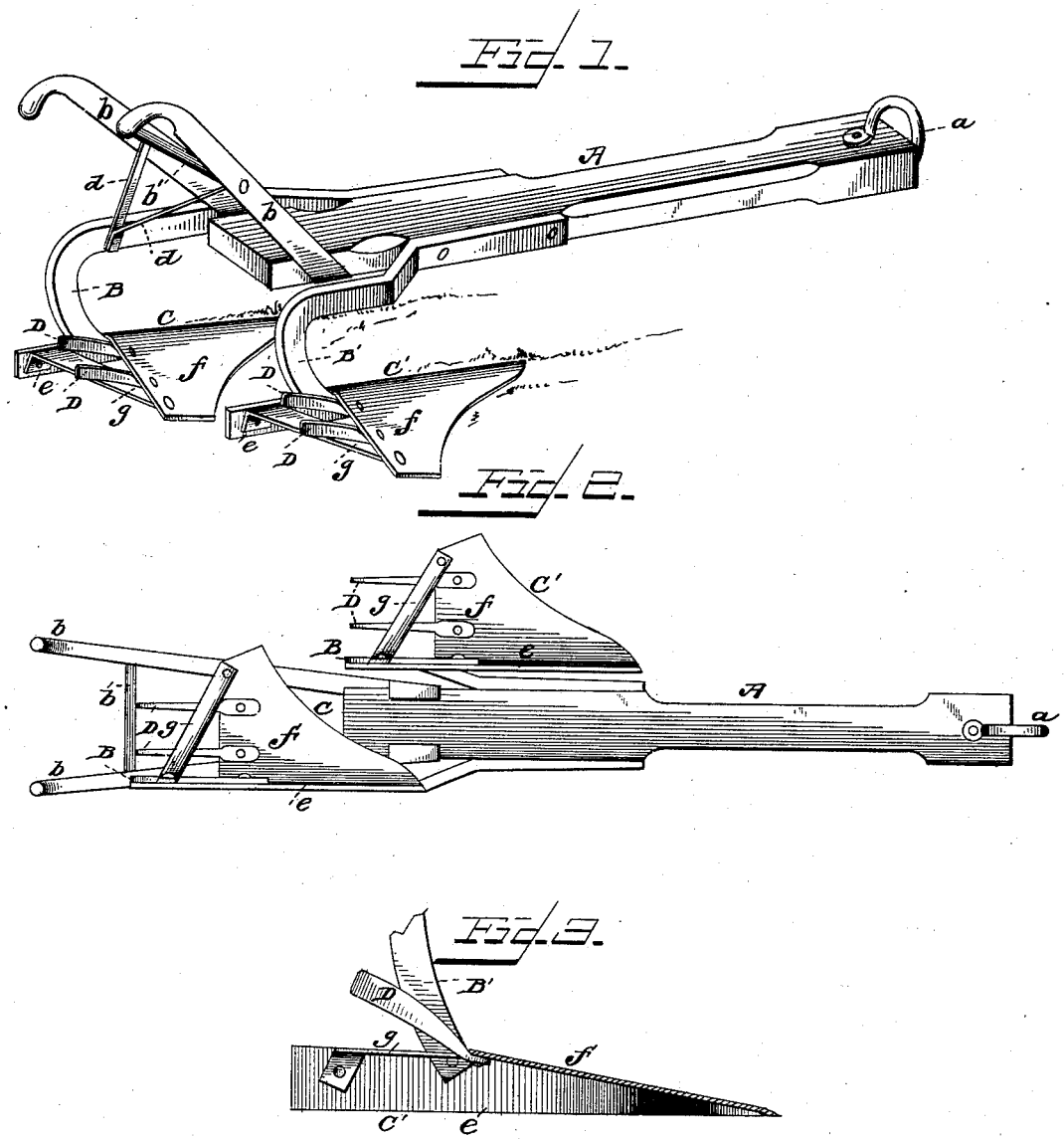
WITNESSES
C. W. Dashiell
E. G. Siggers.
INVENTOR
Richard H. Adair.
By, C. A. Snow & Co.
Attorneys

United States Patent Office.

RICHARD HARDING ADAIR, OF STOVALL, ASSIGNOR OF ONE-HALF TO L. R. FAWKES, OF ALEDO, TEXAS.

PLOW.

SPECIFICATION forming part of Letters Patent No. 320,611, dated June 23, 1885.

Application filed April 20, 1885. (No model.)

*To all whom it may concern:*

Be it known that I, RICHARD H. ADAIR, a citizen of the United States, residing at Stovall, in the county of Johnson and State of Texas, have invented a new and useful Improvement in Plows, of which the following is a specification, reference being had to the accompanying drawings.

My invention relates to plows, the object being to provide a device of this character which shall be simple in its construction, strong, and durable, and one that will be thoroughly effective; and, further, to provide the same with a series of cutting-knives and weed-bars, for a purpose which will be explained.

The invention consists in the improved construction and combinations of parts hereinafter fully described, and pointed out in the claims.

In the drawings, Figure 1 is a perspective view of a plow embodying my invention. Fig. 2 is a bottom view, and Fig. 3 is a section through one of the plowshares.

In the accompanying drawings, in which like letters of reference indicate correspondings parts in all the figures, A represents the plow-beam, which may be of wood or metal, provided at its forward end with a clevis, $a$, for the attachment of a draft-animal.

B B′ represent the plow-standards, which are curved, as shown, the standard B being located somewhat in rear of stardard B′.

Secured to the rear end of the beam A are handles $b$, which are connected and braced by a cross-bar, $b'$, and are supported by bars or rods $d$, which are secured to and extend from the standard B.

C C′ represent the plowshares, secured to the lower ends of the standard B B′. In each of these shares the landside $e$ is extended rearwardly, and is connected with the mold-board $f$ by a bar, $g$, which is adapted to remove the roots of weeds, &c.

Secured to the plowshares, at the rear ends thereof and extending upwardly therefrom at an angle of about thirty degrees, are cutting-knives D, which, after the turf or sward has been upturned by the points of the plows, are adapted to cut the same in strips, and also adapted to cut and crush clods of dirt. The dirt, when plowed up, will sift through the cutting-knives and bars $g$, while the weeds and rubbish will be thrown or carried to the top.

It will be seen from the above description, taken in connection with the accompanying drawings, that the furrow is harrowed from the under side, and that the knives and bars $g$ are thoroughly efficient and effective for the purposes intended.

Having fully described my invention, what I claim as new, and desire to secure by Letters Patent, is—

1. The combination, with a plowshare, of cutting-knives secured to the rear end thereof and extending rearwardly therefrom and in a slightly upward direction, substantially as set forth.

2. The combination, with a plowshare, of cutting-knives secured to the rear end thereof and extending rearwardly therefrom in an upward direction, and a bar, $g$, connecting the mold-board and landside and arranged below the cutting-knives, substantially as set forth.

In testimony that I claim the foregoing as my own I have hereto affixed my signature in presence of two witnesses.

RICHARD HARDING ADAIR.

Witnesses:
F. M. WATSON,
T. J. OVERMIER.